United States Patent
Marlier et al.

(10) Patent No.: US 9,981,506 B2
(45) Date of Patent: May 29, 2018

(54) COMBINATION OF A HEAVY GOODS VEHICLE TIRE STRUCTURE WITH A TREAD PATTERN

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Fabien Marlier, Clermont-Ferrand (FR); Benjamin Quantinet, Clermont-Ferrand (FR); Eric Slachmuylders, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 276 days.

(21) Appl. No.: 14/363,940

(22) PCT Filed: Dec. 5, 2012

(86) PCT No.: PCT/EP2012/074455
§ 371 (c)(1),
(2) Date: Jun. 9, 2014

(87) PCT Pub. No.: WO2013/083610
PCT Pub. Date: Jun. 13, 2013

(65) Prior Publication Data
US 2014/0352863 A1    Dec. 4, 2014

(30) Foreign Application Priority Data
Dec. 9, 2011    (FR) ..................... 11 61391

(51) Int. Cl.
*B60C 11/00* (2006.01)
*B60C 11/03* (2006.01)
*B60C 11/04* (2006.01)

(52) U.S. Cl.
CPC ........... *B60C 11/0323* (2013.01); *B60C 11/04* (2013.01); *B60C 2200/06* (2013.01)

(58) Field of Classification Search
CPC ....... B60C 11/00; B60C 11/03; B60C 11/032; B60C 11/0323; B60C 11/12; B60C 11/1204; B60C 11/1218
See application file for complete search history.

(56) References Cited

U.S. PATENT DOCUMENTS 2,960,138 A * 11/1960 Chiodo ............... B60C 11/18
152/209.16
4,890,658 A * 1/1990 Kabe ...................... B60C 11/01
152/209.27
(Continued)

FOREIGN PATENT DOCUMENTS

EP    0335694 A2    10/1989
EP    1275527 A2    1/2003
(Continued)

OTHER PUBLICATIONS

PCT/EP2012/074455, International Search Report (ISR), Form PCT/ISA/210, dated Apr. 29, 2013 (including English translation), 7 pgs.

*Primary Examiner* — Justin R Fischer
(74) *Attorney, Agent, or Firm* — Dickinson Wright PLLC

(57) ABSTRACT

Tire for a heavy goods vehicle, comprising a crown reinforcement, and, radially outside this crown reinforcement, a tread having a total thickness PMU of material intended to become worn during running, the crown reinforcement being formed by at least two working plies and a protection ply positioned radially outside the working plies and radially inside the tread, the narrowest working ply having a width in the range from 70% to 90% of the width W of the tread, the protection ply having a width at most equal to 70% of the width of the narrowest working ply, the tread comprising (Continued)

grooves only in the part radially outside the protection ply, each circumferentially orientated groove having a depth at least equal to 75% of the maximum thickness intended to become worn PMU. This tread comprises, axially between an axial end of the narrowest working ply and an axial end of the protection ply located on the same side of the equatorial plane, a channel that is generally circumferentially orientated and runs all the way around the tire, this channel being formed in such a way that the minimum distances between this channel and the working plies and between this channel and the protection ply are different from zero.

8 Claims, 2 Drawing Sheets

(56) References Cited

U.S. PATENT DOCUMENTS

| | | |
|---|---|---|
| 5,275,218 A | 1/1994 | Nakayama et al. |
| 5,445,691 A | 8/1995 | Nakayama et al. |
| 5,603,366 A | 2/1997 | Nakayama et al. |
| 5,759,322 A * | 6/1998 | Courel .............. B29C 66/02245 156/129 |
| 2005/0081972 A1 | 4/2005 | Lopez |
| 2007/0144641 A1 | 6/2007 | Nguyen et al. |
| 2008/0128062 A1 | 6/2008 | Lopez |
| 2011/0214789 A1 * | 9/2011 | Cress ................. B29D 30/0606 152/209.1 |
| 2011/0277898 A1 * | 11/2011 | Barraud .............. B60C 11/0306 152/209.18 |
| 2012/0103485 A1 | 5/2012 | Colby |

FOREIGN PATENT DOCUMENTS

| | | | |
|---|---|---|---|
| EP | 1800843 A2 | | 6/2007 |
| EP | 2191984 A2 | | 6/2010 |
| JP | 2002-248907 | * | 9/2002 |
| KR | 2000046267 | * | 7/2000 |
| WO | 03097384 A1 | | 11/2003 |
| WO | 2010053478 A1 | | 5/2010 |
| WO | 2011002454 A1 | | 1/2011 |
| WO | 2011135000 A1 | | 11/2011 |

* cited by examiner

COUPE SELON V-V

COMBINATION OF A HEAVY GOODS VEHICLE TIRE STRUCTURE WITH A TREAD PATTERN

This application is a 371 national phase entry of PCT/EP2012/074455, filed 5 Dec. 2012, which claims benefit of the filing date of FR 1161391, filed 9 Dec. 2011, the entire contents of which are incorporated herein by reference for all purposes.

BACKGROUND

1. Field

The present disclosure relates to tires for heavy goods vehicles, and more particularly to tires intended for fitting to heavy goods vehicles.

The present disclosure relates to a tire with a radial carcass reinforcement, intended for fitting to heavy vehicles such as lorries, buses, tractors, trailers and the like, and relates more particularly to the crown reinforcement of this tire in combination with its tread.

Generally, the radial carcass reinforcement of the tire in question, formed by inextensible metal or aromatic polyamide reinforcing elements, is surmounted on the radially outer side by a crown reinforcement comprising a plurality of crown plies. In a well-known embodiment, the crown reinforcement comprises a triangulation ply formed by metal elements orientated at an angle in the range from 45 to 90 degrees relative to the circumferential direction, said triangulation ply being itself surmounted by two working plies formed by inextensible metal reinforcing elements, parallel to each other in each ply and crossing over from one ply to the next, forming angles in the range from 10 to 45 degrees with the circumferential direction. These working plies, forming the working reinforcement, are covered with at least one ply called the protection ply, which essentially serves to provide protection for the working plies against damage that may be caused by foreign bodies penetrating into the grooves of the tread.

This ply may be formed by metal reinforcing elements called "extensible" or from elements called "elastic", that is to say those whose force-elongation curve shows a relatively large elongation under a low tensile force. In this case, the reinforcing elements of the protection ply are generally orientated in the same direction and at the same angle in absolute terms as the reinforcing elements of the radially outermost working ply, and are generally axially narrower than the radially outermost working ply. This protection ply may be made of any material and with any structure which serves the purpose of protecting the working reinforcement; a homogeneous material in the form of circumferentially wound bands or a ply may be considered.

In combination with this internal reinforcement structure, there is a known way of providing the tread, that is to say the part of the tire intended to come into contact with the ground as it rolls and to become progressively worn, with a tread pattern formed of grooves and slits.

In the present application, the slits are distinguished from the grooves in that the slits are narrow, generally allowing contact between the facing walls that delimit them during running, and notably during passage through the footprint, which would not be the case for the grooves in normal conditions of use of the tire.

2. Description of Related Art

The document US-20100269967-A describes a heavy goods tire comprising a radial carcass reinforcement surmounted by a crown reinforcement, centered on the equatorial plane, which is itself surmounted by a tread. This reinforcement comprises a plurality of working plies surmounted by a protection ply whose width is substantially smaller than the width of the narrowest working ply. This protection ply is located radially within two grooves arranged symmetrically about the equatorial plane. Axially outside these two grooves, the tread is provided on each side with a groove having the same depth as the other two grooves. In order to have high performance in terms of endurance, this structure requires the presence of a minimum thickness between the bottom of the grooves and the last of the working plies in the region located axially beyond the protection ply.

The document WO 2011/002454 describes a tire produced by retreading, this tire comprising a carcass surmounted radially externally by a crown reinforcement, which is itself surmounted by a pre-vulcanized tread. This tread comprises a plurality of grooves opening on the outside and grooves opening on the inner face of the tread. The latter are provided to form new grooves after the partial wear of the tread. The set of inner and outer grooves is placed radially above the set of plies forming the crown reinforcement. The edge rib formed in this way is relatively rigid, since the set of the plies of the crown reinforcement is present therein.

There is a need for a tire structure for heavy goods vehicles which, combined with a tread pattern, allows better optimization of performance in terms of rolling resistance, endurance and levelling in contact with a road, while providing optimal safety regardless of the state of wear of the tire.

Definitions

The proportion of voids per unit volume of a tread pattern is equal to the ratio between the volume of the voids (formed notably by grooves and cavities) delimited by the relief elements (blocks and ribs) and the total volume including the volume of material and the volume of the grooves and cavities. A low proportion of voids per unit volume indicates a low volume of voids relative to the volume of the tread.

A block is a relief element formed on a tread, this element being delimited by voids or grooves and comprising lateral walls and a contact face, the latter being intended to come into contact with the road during running.

A rib is a relief element formed on a tread, this element being delimited by two grooves. A rib comprises two lateral walls and a contact face, the latter being intended to come into contact with the road.

The term "radial direction" denotes a direction which is perpendicular to the axis of rotation of the tire (this direction corresponds to the direction of the thickness of the tread).

The term "axial direction" denotes a direction parallel to the axis of rotation of the tire.

The term "circumferential direction" denotes a direction which is tangent to any circle centered on the axis of rotation. This direction is perpendicular to both the axial direction and a radial direction.

A "cut-out" denotes in a generic way either a groove or a slit, and corresponds to the space delimited by walls of material facing each other and spaced apart by a non-zero distance. It is this distance that differentiates a slit from a groove; in the case of a slit, this distance is adapted to allow at least part of the opposed walls delimiting said slit to be brought into contact during passage through the footprint on the road. In the case of a groove, the walls of this groove cannot come into contact with each other in the usual running conditions.

The conditions of use of the tire, as defined, notably, by the ETRTO standard, specify the nominal inflation pressure corresponding to the load capacity of the tire indicated by its load index and its speed code.

The footprint on the road is determined with the tire in static conditions, on the basis of which an average footprint length is calculated.

The equatorial plane corresponds to the plane perpendicular to the axis of rotation of the tire and passing through the radially outermost points when this tire is mounted on its mounting rim and inflated to its nominal inflation pressure.

SUMMARY

The embodiments of the present invention are intended to provide better optimization of the performance of heavy goods vehicle tires in terms of rolling resistance and endurance, while providing optimal user safety, regardless of whether the tire is new or partially worn.

Thus the heavy goods vehicle tire according to embodiments of the invention comprises a carcass reinforcement surmounted by a crown reinforcement, this crown reinforcement extending on either side of an equatorial plane dividing the tire into two equal or substantially equal parts, and, radially outside this crown reinforcement, a tread having a width W and a total thickness E, this total thickness E corresponding to the total thickness of material measured on the equatorial plane between the rolling surface and the radially outermost part of the crown reinforcement, this tread having a maximum thickness PMU of material intended to become worn during running, this maximum thickness PMU being equal to or less than the total thickness E.

The crown reinforcement is formed by at least two working plies and a protection ply positioned radially outside the working plies and radially inside the tread, the narrowest working ply having a width in the range from 70% to 90% of the width W of the tread.

A working ply comprises reinforcers orientated at an angle in the range from 15 to 25 degrees to the circumferential direction on the tire, in order to contribute, notably, to the balancing of the forces associated with the pressurizing of the tire. A protection ply serves to protect the working plies, and is generally strengthened by reinforcers having force-elongation curves with two distinct slopes, these reinforcers being adapted to be substantially deformed under a small force (unlike the reinforcers of the working plies).

The tread according to embodiments of the invention is provided with grooves only in the part radially outside the protection ply and between the axial ends of said ply, each circumferentially orientated groove having a depth at least equal to 75% of the maximum thickness of wear PMU.

This tire is characterized in that:
the protection ply has a width at most equal to 70% of the width of the axially narrowest working ply.
the tread comprises, axially between the axial end of the narrowest working ply and the axial end of the protection ply, these two ends being located on the same side of the equatorial plane, a channel that is generally circumferentially orientated (that is to say, running around the whole of the tire), intended to form at least one new groove after partial wear equal to at least 50% of the maximum thickness of material intended to become worn PMU, this channel being formed in such a way that the minimum distances between this channel and the working plies and between this channel and the protection ply are different from zero.

In a variant of the invention, the tread comprises a plurality of ribs, including two shoulder ribs. Each shoulder rib is delimited by a groove opening on the outside and the points of the tread axially most distant from the equatorial plane. If the width of this shoulder rib on the rolling surface in the new state is denoted M, it is advantageous for this width M to be at least 1.5 times the width of the other ribs.

In another variant, the tread according to the invention is such that each channel is extended in the thickness of the tread in the new state towards the rolling surface by a slit having an appropriate geometry to allow said slit to close, at least partially, during passage through the footprint. This arrangement is particularly advantageous because, given the width of the shoulder ribs, it makes it possible to restore flexibility in bending and therefore in levelling during passage through the footprint.

In a variant of the invention, the tread is such that, in the new state, the volume of voids in each channel is not less than 2% and not more than 15% of the total volume of voids formed by the set of channels, grooves and slits, regardless of the orientation of said channels, grooves or slits.

In a variant, the tread according to the invention is such that the total volume of voids in the tread in the new state is not more than 18% of the total volume of material intended to become worn during running, that is to say the volume corresponding to a thickness PMU.

In another variant, the tread according to the invention is such that, each slit being delimited by faces opposing each other, these faces comprise means for mechanically blocking relative movements of said faces with respect to each other.

In another variant, the tread according to the invention is such that each channel extends in the thickness of the tread to a depth greater than the maximum thickness of material intended to become worn PMU and, at most, over the total thickness E.

In another variant, the tread according to the invention is such that at least one circumferential channel has an "undulating" geometry at least in the direction of the thickness of the tread, so that it does not open continuously on the rolling surface after an appropriate degree of wear.

In another variant, the tread according to the invention is such that the at least one circumferential channel having an undulating geometry is entirely formed under the rolling surface of the tread in the new state.

In another variant, the tread according to the invention is such that at least one circumferential lateral channel has an "undulating" geometry at least in a direction parallel to the axis of rotation of the tire, so that it remains at the same distance from said axis of rotation. This variant is particularly useful in that the position of the lateral channel is variable with respect to the end of the protection ply, thus reducing the stresses.

In another advantageous variant, at least one additional channel is provided, linking a circumferential channel formed between the ends of the protection ply and the end of the axially narrowest working ply, this additional channel also opening into a groove or towards the outside of the tread. This arrangement provides a kind of network allowing air to circulate from the inside towards the outside and vice versa, thus promoting better thermal regulation of the edges of the tread.

Advantageously, the tread according to embodiments of the invention as described is provided to be fitted on a tire whose recommended use is that of being mounted on a driving axle of a heavy goods vehicle. Advantageously, this tire comprises a means indicating its preferred use.

Other characteristics and advantages of embodiments of the invention will be made clear by the following description provided with reference to the appended drawings, which show, by way of non-limiting examples, variant embodiments of what is proposed by the invention.

DETAILED DESCRIPTION OF SPECIFIC EMBODIMENTS

Figure 1:
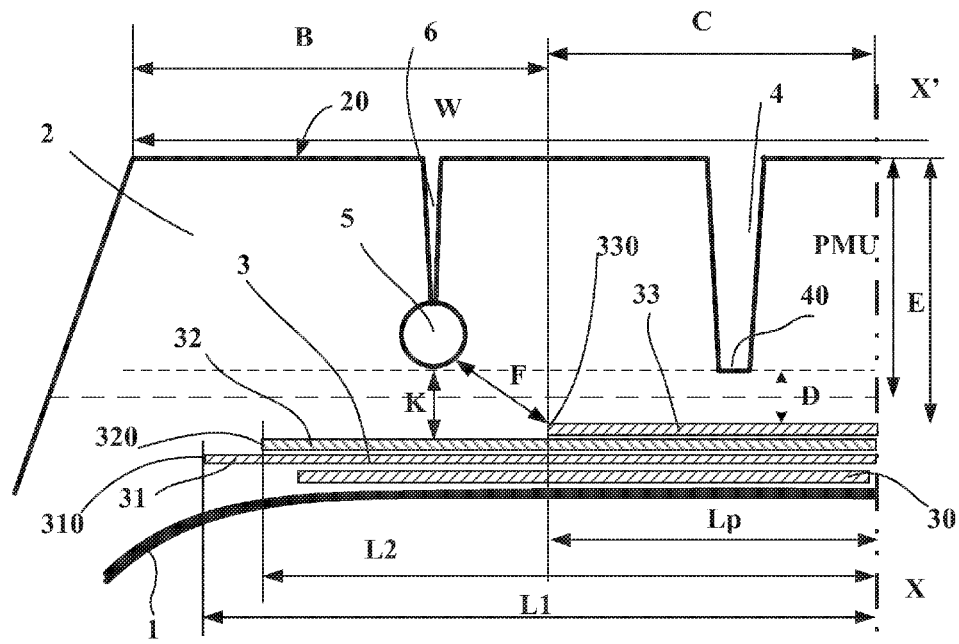
FIG. 1 shows a sectional view of a tire according to a first variant of the invention.

In the drawings accompanying this description, the same reference symbols may be used to describe variants of the invention where these reference symbols signify elements which are of the same kind in respect of their structure or function.

FIG. 1 shows a partial view of one half of a tire with a size of 315/70 R 22.5 comprising two beads extended by sidewalls joined at a crown, this tire being reinforced by a radial carcass reinforcement composed of a single ply 1 of metal cords. The crown of the tire comprises a crown reinforcement surmounted in a radially outer position by a tread 2 comprising a rolling surface 20. The carcass reinforcement is fixed in each bead to a bead core to form a turnover. This carcass reinforcement is surmounted, in a radially outer position, by the crown reinforcement 3, which comprises, radially from the inside to the outside:

- a first crown ply 30 called a "triangulation ply" composed of metal cords, these cords being orientated at an angle equal or close to 65 degrees to the circumferential direction (the direction perpendicular to the plane of FIG. 1);
- surmounting this crown ply 30, a first working ply 31, composed of metal cords forming an angle of 18 degrees with the circumferential direction, the cords of the triangulation ply 30 and the first working ply 31 having the same orientation with respect to the circumferential direction; in the present case, one half of the total axial width L1 of this working ply is equal to 252 mm (this half width is measured between the equatorial plane XX' and the end 310 of the working ply 31);
- then a second working ply 32, composed of metal cords identical to those of the first working ply 31, and forming an angle with the circumferential direction opposed to the angle of the first working ply 31 and, in the illustrated case, equal to 18 degrees in absolute terms; the total axial width L2 of the second working ply is equal to 232 mm;
- and finally, surmounting this second working ply 32 on both sides of the equatorial plane, a protection ply 33 composed of metal cords, orientated with respect to the circumferential direction at an angle in the same direction as the angle of the cords of the second working ply, and equal to this angle in absolute terms, this protection ply serving to protect the working plies from external damage during running. The cords of this protection ply have a relative elongation of not more than 0.2% under a tensile load equal to 10% of the breaking load.

The width Lp of the protection ply is equal to 124 mm.

The total width W of the tread, corresponding to the width of the footprint in the conditions of use, is equal to 280 mm. The set of plies of the crown reinforcement 3 are positioned so as to be equally distributed on both sides of the equatorial plane XX'.

In part C of the tread, located radially outside the protection ply 33 and having the same width as the protection ply 33, there is a groove 4 on either side of the equatorial plane XX', this groove having a depth of 20 mm in the new state. The width of this groove 4 varies with the depth: on the rolling surface 20 in the new state, this width is equal to 10.5 mm, and at 1.6 mm from the bottom of the groove 40 this width is equal to 4 mm. This tread 2 is also designed to allow "regrooving"; that is to say, each groove 4 can be treated, before reaching the limit wear level, by a mechanical cutting operation, to recreate a groove having an average depth of 3 mm. In the present case, the maximum height of material intended to become worn, corresponding to the thickness PMU, is equal to 23 mm in the new state (20 mm of depth of the groove 4, to which are added the 3 mm provided for regrooving). Additionally, the protection ply 33 is positioned at a distance D of 5 mm from the bottom of the groove 40, enabling a thickness of material of 2 mm to be retained between this protection ply 33 and the bottom of the groove 40 after regrooving. The total tread thickness E is measured between the rolling surface 20 and the outside of the protection ply 33 on the equatorial plane in the new state; in this case, it is equal to 25 mm.

A channel 5 of circular cross section, with a diameter of 6 mm, is formed, axially between the end 330 of the protection ply 33 and the end 320 of the outermost working ply 32. This circumferentially orientated channel 5 is positioned so as to be entirely within the tread in the new state, and more precisely at a distance of 14 mm from the rolling surface 20. In the present case, the bottom 51 of this channel 5 (corresponding to the points of said channel nearest the inside of the tread) is at the same distance from the rolling surface 20 as the bottom of the groove 40 in the new state.

The minimum distance F between the points delimiting this channel 5 and the end 330 of the protection ply 33 located on the same side of the equatorial plane XX' is equal to 20 mm, while the minimum distance K of the points delimiting this channel 5 from the radially outermost working ply 32 is equal to 7 mm.

This circumferentially orientated channel 5 runs around the whole of the tire and is extended radially outwards by a slit 6, the width of whose opening on the rolling surface 20 in the new state is equal to 3.5 mm. This slit 6 opens into the channel 5 with a width of 2 mm. The dimensions of the slit 6 are such that said slit is at least partially closed during its passage through the footprint on the road, so that the channel 5 can be closed, thereby preventing the entry of foreign bodies that may be present on the road while the tire is running.

Running tests have been conducted, in which tires according to embodiments of the invention were compared with tires of the same size in which additional grooves were formed in place of the channels, while the protection ply was extended axially beyond said grooves. The other reinforcements in both the carcass and the crown were identical to those of the tire according to the invention. These tests demonstrated a gain in terms of rolling resistance in the tires according to the invention (that is to say, lower energy consumption during running) and a significant improvement in braking performance when the tire was partially worn. Furthermore, the tire according to embodiments of the invention showed significantly improved performance in terms of penetration of objects into the tread, and therefore resulted in greater endurance of the crown reinforcement.

Figure 2:
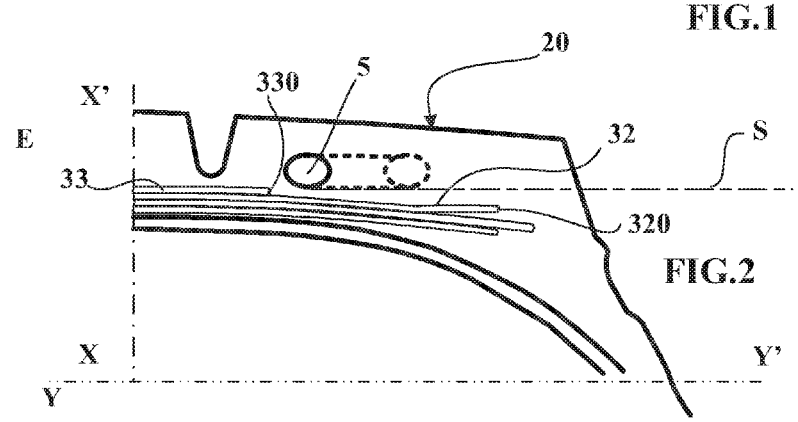
FIG. 2 shows a sectional view of a tire according to another variant of the invention.

The variant shown in FIG. 2 has some of the same characteristics as the tire shown in FIG. 1. However, the channel 5 is formed so as to follow an undulating path on a virtual cylindrical surface S whose axis coincides with the axis of rotation of the tire. Thus the channel 5 is at a constant, or virtually constant, distance from the rolling surface 20 of the tire in the new state. The points radially farthest inward from this channel are at a depth which is close to, or possibly equal to, the total tread thickness E. This variant has no slit extending the channel towards the outside, that is to say towards the rolling surface in the new state. This channel can be molded on the radially inner side of the tread, with the presence of a slit opening towards this radially inner surface of the tread if necessary, before the tread is applied to a tire blank. The advantage of the provision of this variant is that the sensitivity of the ends 330 of the protection ply is reduced even further by moving the channel away, partially at least, from said ends.

Figure 3:
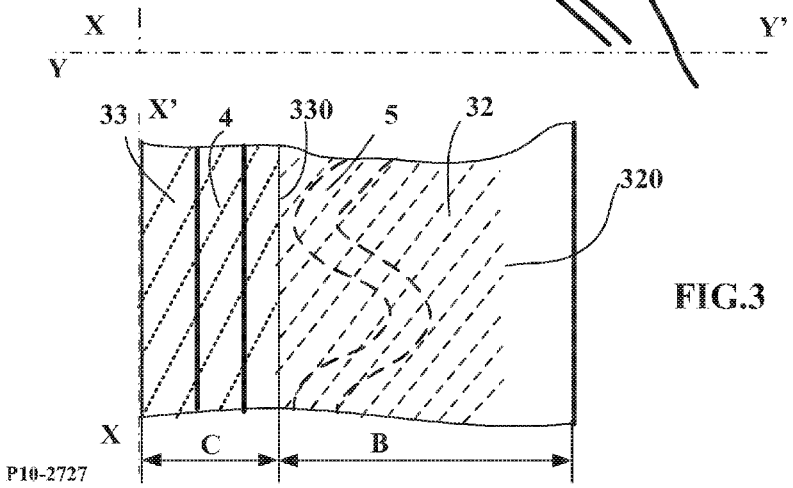
FIG. 3 shows a plan view of the tread of the tire of FIG. 2.

FIG. 3 shows in a partial manner a plan view of the variant shown in cross section in FIG. 2, in which the undulating geometry followed by the channel 5 in the lateral parts B of the tread can be seen.

The last-mentioned variant may be modified so that the channel overlaps, at least partially, the end of the narrowest working ply.

Figure 4:
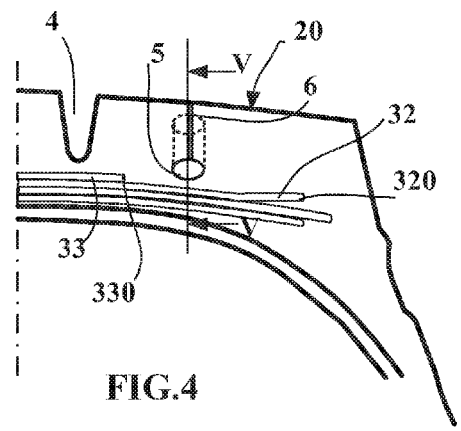
FIG. 4 shows another variant of the tire according to the invention, in which the channel undulates in the depth of the tread.
Figure 5:
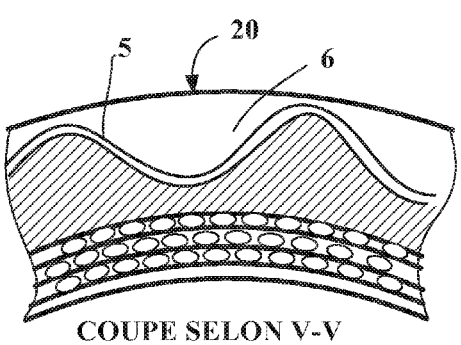
FIG. 5 shows a side view of part of the tread of FIG. 4.

In a variant shown in FIG. 4, each channel 5 may undulate so as to move alternately towards and away from the rolling surface 20 in the new state. In this variant, the channel 5 is extended to the rolling surface 20 by a slit 6. Evidently, this arrangement can be combined with the arrangement shown in FIGS. 2 and 3 to obtain undulations of the channel in both the thickness and the width of the tread. FIG. 5 shows a cross-sectional view taken through a plane whose trace is identified by the letters V-V in FIG. 4. In this cross section, it can be seen that the channel 5 oscillates so as to move towards and then away from the rolling surface 20. In this variant, it is advisable to provide additional channels, each connected at one end to the parts of the oscillating channel 5 most remote from the rolling surface 20 and at the other end to the groove 4.

Figure 6:
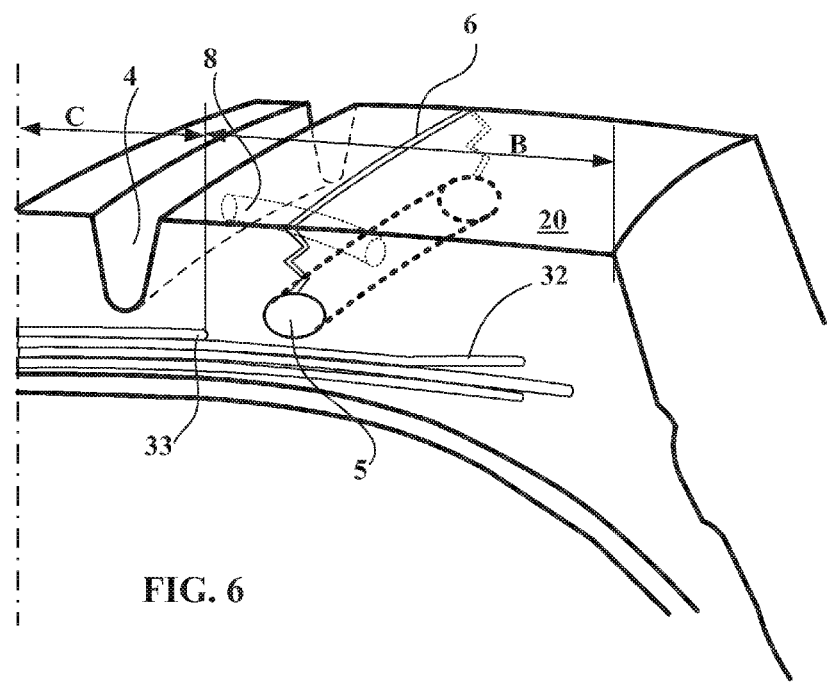
FIG. 6 shows a variant according to the invention in which the channel is extended towards the rolling surface by a slit having undulations in the thickness of the tread.

In another variant shown in FIG. 6, each circumferential channel 5 is extended radially towards the rolling surface 20 of the tread in the new state by a slit 6 of substantially constant width, this slit comprising, on the walls delimiting it, means for mechanically blocking the relative movement of said walls. In this variant, this slit 6 follows a zigzag geometry in the thickness of the tread. This arrangement makes it possible not only to limit the decrease in rigidity caused by the presence of a slit, but also to limit the possible penetration of a foreign body into the underlying channel.

In all the variants described here, it may also be advisable to adapt accordingly the nature and properties of the constituent materials of the tread in the regions indicated by the letters B and C, notably in FIGS. 1 and 6.

This variant also shows a plurality of transverse channels 8 originating in the circumferential channel 5 and opening at their other ends in a circumferential groove. This advantageous arrangement provides the benefit, within the tread and as near as possible to the region close to the end of the crown reinforcement, of a form of ventilation by circulation from the groove towards the channel through the transverse channels linking the groove with the circumferential channel. Because of this combination of the grooves and the circumferential and transverse channels, a kind of network is formed on the surface and in a position underlying the rolling surface in the new state.

In another variant, not shown here, provision is made to link each generally circumferentially orientated channel with a plurality of transversely orientated channels, the latter opening on the lateral walls outside the tread so as to facilitate the lateral discharge of fluid, notably during travel in rainy weather, and also so as to promote better ventilation of the part of the tread located in the vicinity of the axial end of the crown reinforcement.

The invention has been described in general terms, supported by a number of variants, but it is to be understood that this invention cannot be limited to these variants alone. Clearly, various modifications can be made to it without departure from the general context of the present invention. Notably, the number of channels may be greater than unity on each side of the equatorial plane, depending on the size of the tire and/or the use. Similarly, these circumferentially orientated channels may be connected to other channels, also provided under the rolling surface in the new state and opening laterally, for example on the sides of the tread.

All the described variants may advantageously be combined with each other, depending on the aims of persons skilled in the art who make use of the present invention.

The invention claimed is:

1. A tire for a heavy goods vehicle, this tire comprising:
   a carcass reinforcement,
   a crown reinforcement surmounting the carcass reinforcement and extending on either side of an equatorial plane XX' dividing the tire into two equal or substantially equal parts, and
   a tread radially outside the crown reinforcement having a rolling surface with a width W and a total thickness E, this total thickness E corresponding to the total thickness of material measured on the equatorial plane XX' between the rolling surface and a radially outermost part of the crown reinforcement, and having a maximum thickness PMU of material intended to become worn during running, wherein the maximum thickness PMU is at the most equal to the total thickness E,
   wherein the crown reinforcement is formed by at least two working plies and a protection ply positioned radially outside the working plies and radially inside the tread,
   wherein a narrowest working ply has a width in the range from 70% to 90% of the width W of the tread,
   wherein the tread comprises circumferentially oriented grooves, each of the circumferentially oriented grooves only being within axial ends of the protection ply,
   wherein each circumferentially orientated groove has a depth of at least 75% of the maximum thickness intended to become worn PMU,
   wherein the tread consists of only two generally circumferentially orientated channels, running around the whole of the tire and intended to form at least one new groove after partial wear equal to at least 50% of the maximum thickness of material intended to become worn PMU, wherein the two circumferentially orientated channels are formed in such a way that minimum distances between this channel and the working plies and the protection ply are different from zero,
   wherein the protection ply has a width at most equal to 70% of the width of the narrowest working ply, wherein the two generally circumferential channels are formed axially between an axial end of the narrowest working ply and an axial end of the protection ply located on the same side of the equatorial plane; and wherein the two circumferentially oriented channels have an undulating geometry at least in the direction of the thickness of the tread, so that it does not open continuously on the rolling surface after an appropriate degree of wear.

2. The tire for a heavy goods vehicle according to claim 1, wherein each channel is extended in the thickness of the tread in the new state towards the rolling surface by a slit having an appropriate geometry to allow said slit to close, at least partially, during passage through a footprint of the tire on the road.

3. The tire for a heavy goods vehicle according to claim 1, wherein, in the new state, the volume of voids in each channel is not less than 2% and not more than 15% of the total volume of voids formed by the set of channels, grooves and slits, regardless of the orientation of said channels, grooves or slits.

4. The tire for a heavy goods vehicle according to claim 1, wherein each channel extends in the thickness of the tread to a depth greater than the maximum thickness of material intended to become worn PMU and, at most, over the total thickness E.

5. The tire for a heavy goods vehicle according to claim 1, wherein the at least one circumferential channel having an undulating geometry is entirely formed under the rolling surface of the tread in the new state.

6. The tire for a heavy goods vehicle according to claim 1, wherein at least one circumferential channel has an undulating geometry at least in a direction parallel to an axis of rotation of the tire, so that it remains at the same distance from said axis of rotation.

7. The tire according to any of claim 1, wherein at least one additional channel is provided, linking a circumferential channel formed between the ends of the protection ply and the end of the axially narrowest working ply, this additional channel also opening into a groove through the outside of the tread.

8. The tire according to any of claim 1, further comprising a means indicating that the tire is suitable for mounting on a driving axle of a heavy goods vehicle.

* * * * *